(12) United States Patent
Jeanson et al.

(10) Patent No.: US 12,216,086 B2
(45) Date of Patent: Feb. 4, 2025

(54) MULTIPLEXING READOUT CIRCUIT AND METHOD FOR ELECTROMAGNETIC INSPECTION ARRAY PROBE

(71) Applicant: Eddyfi Canada Inc., Québec (CA)

(72) Inventors: Francis Jeanson, Québec (CA); Florian Hardy, Québec (CA)

(73) Assignee: EDDYFI CANADA INC., Québec (CA)

( * ) Notice: Subject to any disclaimer, the term of this patent is extended or adjusted under 35 U.S.C. 154(b) by 119 days.

(21) Appl. No.: 18/076,540

(22) Filed: Dec. 7, 2022

(65) Prior Publication Data

US 2023/0176013 A1    Jun. 8, 2023

Related U.S. Application Data

(60) Provisional application No. 63/265,103, filed on Dec. 8, 2021.

(51) Int. Cl.
   *G01N 27/90*      (2021.01)
(52) U.S. Cl.
   CPC ................................ *G01N 27/9006* (2013.01)
(58) Field of Classification Search
   None
   See application file for complete search history.

(56) References Cited

U.S. PATENT DOCUMENTS

| 10,267,767 B2 | 4/2019 | Bastien | |
| 2017/0315096 A1* | 11/2017 | Bastien | H03L 7/081 |

FOREIGN PATENT DOCUMENTS

| JP | S58 34357 A | 2/1983 |
| JP | S63 274858 A | 11/1988 |
| JP | H05 72180 A | 3/1993 |
| WO | WO 93/14581 A1 | 7/1993 |

OTHER PUBLICATIONS

Extended European Search Report for corresponding application No. EP 22211992.7 dated Apr. 24, 2023, 9p.
Krishnamurthy, Gautham et al., "Time Division Multiplexing Front-Ends for Multiantenna Integrated Wireless Receivers", *IEEE Transactions on Circuits and Systems*, v. 57, No. 6, Jun. 1, 2010, 13.

* cited by examiner

*Primary Examiner* — Jas A Sanghera
(74) *Attorney, Agent, or Firm* — Crowell & Moring LLP

(57) ABSTRACT

A readout circuit for an electromagnetic inspection system for nondestructive testing of a test object is disclosed. The inspection system includes a plurality of sensors for sensing an electromagnetic response from the test object and generating therefrom a plurality of response signals. The readout circuit can include a plurality of anti-aliasing filters, each configured to receive the response signal from one of the sensors and bandlimit the response signal to produce one of a plurality of bandlimited signals. The readout circuit can also include a time-division multiplexer configured to multiplex the bandlimited signals into a time-division multiplexed (TDM) signal including a sequence of frames outputted at a TDM frame rate, each frame including a plurality of time slots, each time slot assigned to one of the bandlimited signals, wherein the anti-aliasing filters are configured to operate based on the TDM frame rate to attenuate aliasing artifacts in the TDM signal.

20 Claims, 13 Drawing Sheets

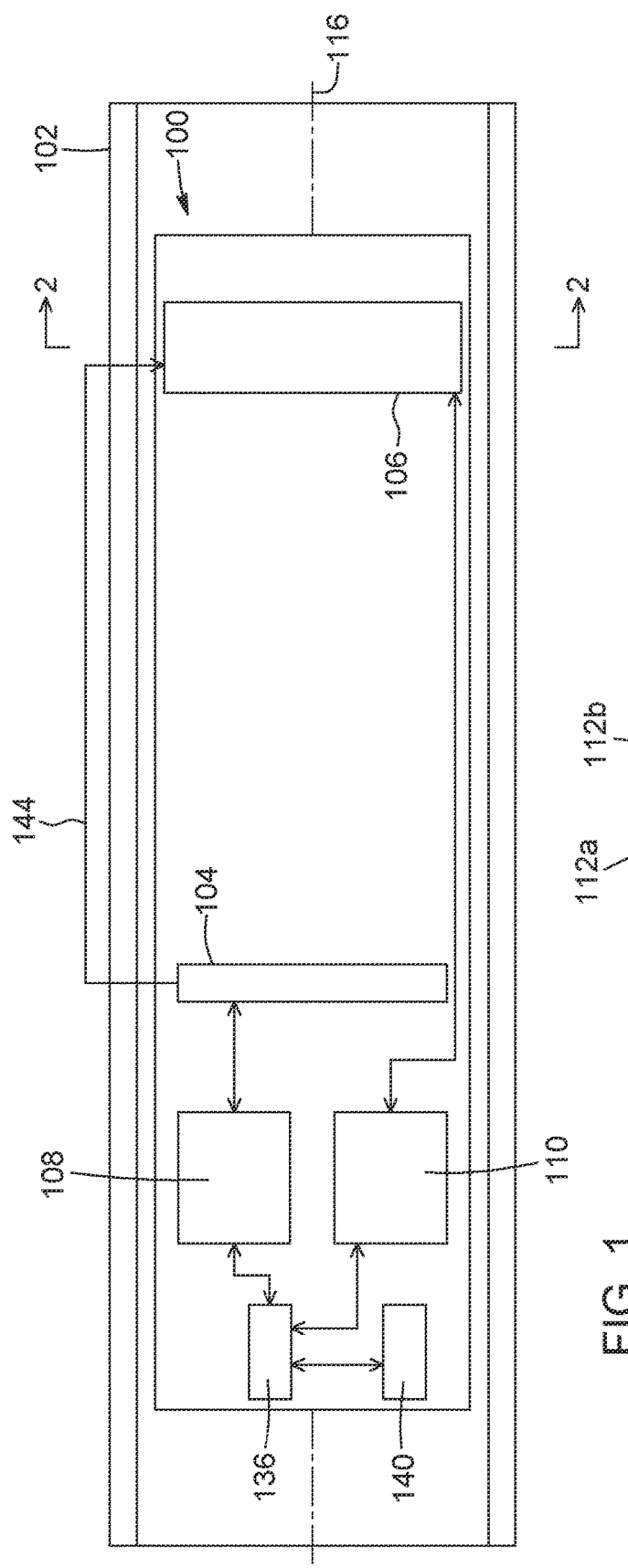
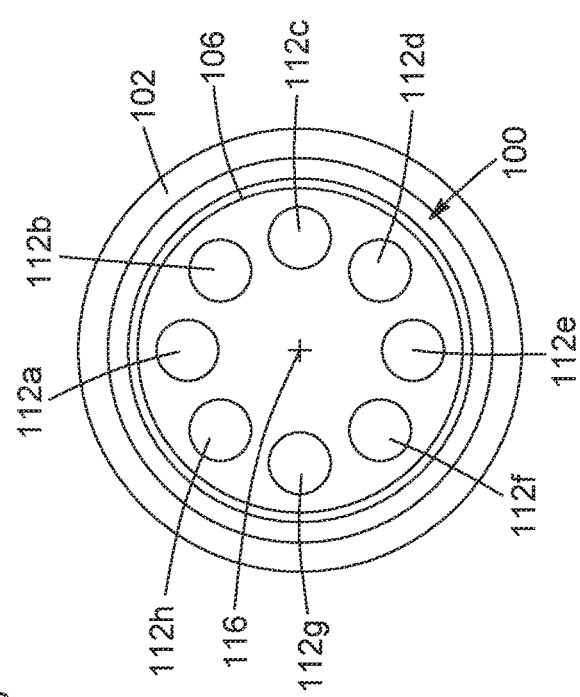
FIG. 1
FIG. 2

MULTIPLEXING READOUT CIRCUIT AND METHOD FOR ELECTROMAGNETIC INSPECTION ARRAY PROBE

RELATED PATENT APPLICATION

The present application claims priority to U.S. Provisional Patent Application No. 63/265,103 filed on Dec. 8, 2021, the disclosure of which is incorporated herein by reference in its entirety.

TECHNICAL FIELD

The technical field generally relates to electromagnetic testing and, more particularly, to multiplexing readout techniques for electromagnetic inspection array probes.

BACKGROUND

Various electromagnetic inspection techniques for nondestructive testing are available. Non-limiting examples include eddy-current testing (ECT), remote-field testing (RFT), and near-field testing (NFT). A conventional electromagnetic inspection probe used for ECT, RFT, or NFT can include an emitter coil and a receiver coil. The emitter coil is configured to generate a time-varying magnetic field to induce eddy currents within a test object. The receiver coil is configured to receive part of the magnetic field produced by the emitter coil, along with secondary magnetic fields produced by the induced eddy currents. The receiver coil is also configured to generate a response signal indicative of the received magnetic fields. The response signal, which can be a current or a voltage, conveys information about the induced eddy currents, and thus about the test object. This information can be leveraged in various inspection applications, such as flaw detection, materials characterization, and dimensional measurements. The emitter and receiver coils can be coupled to electrical circuits configured to generate driving signals for exciting the emitter coil and to process the response signals generated by the receiver coil. In some applications, multi-sensor array probes can be used. A multi-sensor array probe includes a plurality of individual sensors configured to generate a respective plurality of response signals. Multi-sensor array probes can have several advantages over single-sensor probes. Non-limiting examples include faster inspection times, larger surface coverage, finer spatial resolution, higher flaw detection probabilities, and improved flaw characterization capabilities. Multi-sensor array probes can use signal multiplexing, for example, time-division multiplexing (TDM), to reduce the number of readout circuit components and improve inspection speeds. Despite their advantages, challenges remain in the field of multiplexed electromagnetic inspection techniques for nondestructive testing.

SUMMARY

The present description generally relates to multiplexing readout techniques for use in electromagnetic inspection array probes and systems, for example, eddy-current array (ECA) probes, remote-field array (RFA) probes, and near-field array (NFA) probes, as well as other types of array probes that may or may not rely on the eddy current effect for their operation.

In accordance with an aspect, there is provided a readout circuit for an electromagnetic inspection system for nondestructive testing of a test object, the electromagnetic inspection system including a plurality of sensors configured to sense an electromagnetic response from the test object and generate a respective plurality of response signals from the sensed electromagnetic response, the readout circuit including:
  a plurality of anti-aliasing filters, each anti-aliasing filter being configured to receive the response signal from a respective one of the sensors and to bandlimit the respective response signal to produce a respective one of a plurality of bandlimited signals; and
  a time-division multiplexer coupled to the plurality of anti-aliasing filters and configured to multiplex the plurality of bandlimited signals into a time-division multiplexed (TDM) signal, the TDM signal including a sequence of frames outputted at a TDM frame rate, each frame including a plurality of time slots, each time slot being assigned to a respective one of the plurality of bandlimited signals,
  wherein the plurality of anti-aliasing filters is configured to operate based on the TDM frame rate to attenuate aliasing artifacts in the TDM signal.

In some embodiments, each response signal has a main signal component at an excitation frequency, and each anti-aliasing filter is configured to attenuate the respective response signal at frequencies above an attenuating frequency equal to the TDM frame rate minus the excitation frequency. In some embodiments, the excitation frequency ranges from about 2 Hz to about 20 kHz, and the TDM frame rate ranges between about 10 kHz and about 500 kHz. In some embodiments, the excitation signal can include two or more excitation frequencies. In some embodiments, the TDM frame rate is equal to or more than twice the excitation frequency. In some embodiments, the attenuating frequency is equal to or less than half the TDM frame rate and is higher than the excitation frequency.

In some embodiments, each anti-aliasing filter is configured to attenuate a magnitude of the respective response signal by at least 75% at the attenuating frequency and by at most 5% at the excitation frequency.

In some embodiments, at least one of the plurality of anti-aliasing filters is a low-pass filter. In some embodiments, the low-pass filter has a cutoff frequency that is equal to or less than half the TDM frame rate, and higher than the excitation frequency. In some embodiments, the low-pass filter is a first-order filter. In other embodiments, the low-pass filter is an n-order filter, wherein n is a positive integer greater than one. In some embodiments the low-pass filter is a Butterworth filter, a Bessel filter, a Chebyshev filter, a Cauer filter, or a combination thereof.

In some embodiments, at least one of the plurality of anti-aliasing filters is a band-pass filter. In some embodiments, the band-pass filter has an upper cutoff frequency that is equal to or less than half the TDM frame rate, and higher than the excitation frequency.

In some embodiments, the number of anti-aliasing filters ranges between 2 and 16. In some embodiments, the number of anti-aliasing filters ranges between 8 and 128.

In some embodiments, the readout circuit further includes a plurality of amplifiers, wherein each amplifier is coupled between a respective one of the plurality of sensors and a respective one of the plurality of anti-aliasing filters, and wherein each amplifier is configured to amplify the respective response signal prior to the respective response signal reaching the respective anti-aliasing filter.

In some embodiments, the readout circuit is connected to or includes an analog-to-digital converter configured to digitize the TDM signal into a digital TDM signal, and to a processor (e.g., a digital signal processor) configured to process the digital TDM signal to determine therefrom information conveying a characteristic of the test object. The processing of the digital TDM signal can include a demultiplexing operation. The characteristic can relate to a flaw (e.g., a crack), a dimensional parameter (e.g., a thickness measurement), and/or a material property (e.g., a conductivity measurement).

In some embodiments, the electromagnetic inspection system is or includes an eddy-current array probe, a remote-field array probe, a near-field array probe, or a combination thereof, the electromagnetic inspection system including:
an emitter unit including at least one emitter coil configured to generate an excitation signal to induce eddy currents within the test object; and
a receiver unit including the plurality of sensors, wherein the plurality of response signals conveys information about the eddy currents induced within the test object.

In accordance with another aspect, there is provided a readout method for an electromagnetic inspection system for nondestructive testing of a test object, the electromagnetic inspection system including a plurality of sensors configured to generate a respective plurality of response signals indicative of an electromagnetic response induced from the test object, the readout method including:
receiving the plurality of response signals from the plurality of sensors:
performing a bandlimiting operation on the plurality of response signals to produce a plurality of bandlimited signals; and
performing a time-division multiplexing operation on the plurality of bandlimited signals to produce a time-division multiplexed (TDM) signal including a sequence of frames outputted at a TDM frame rate, each frame including a plurality of time slots, each time slot being assigned to a respective one of the plurality of bandlimited signals,
wherein the bandlimiting operation is carried out based on the TDM frame rate to attenuate aliasing artifacts in the TDM signal.

In some embodiments, the readout method includes, with the plurality of sensors, sensing the electromagnetic response induced from the test object, and generating the plurality of response signals from the sensed electromagnetic response.

In some embodiments, each response signal has a main signal component at an excitation frequency, and the bandlimiting operation includes attenuating each response signal at frequencies above an attenuating frequency equal to the TDM frame rate minus the excitation frequency. In some embodiments, the excitation frequency ranges from about 2 Hz to about 20 kHz, and the TDM frame rate ranges between about 10 kHz and about 500 kHz. In some embodiments, the excitation signal can include two or more excitation frequencies. In some embodiments, the TDM frame rate is equal to or more than twice the excitation frequency. In some embodiments, the attenuating frequency is equal to or less than half the TDM frame rate and is higher than the excitation frequency.

In some embodiments, the bandlimiting operation includes attenuating a magnitude of each response signal by at least 75% at the attenuating frequency and by at most 5% at the excitation frequency.

In some embodiments, the bandlimiting operation includes low-pass filtering the plurality of response signals to produce the plurality of bandlimited signals. In some embodiments, the low-pass filtering operation is based on a cutoff frequency that is equal to or less than half the TDM frame rate.

In some embodiments, the bandlimiting operation includes band-pass filtering the plurality of response signals to produce the plurality of bandlimited signals. In some embodiments, the band-pass filtering operation is based on an upper cutoff frequency that is equal to or less than half the TDM frame rate.

In some embodiments, the number of response signals ranges between 2 and 16, or between 8 and 128.

In some embodiments, the readout method further includes amplifying each response signal prior to performing the bandlimiting operation.

In some embodiments, the readout method further includes digitizing the TDM signal into a digital TDM signal, and processing the digital TDM signal to determine therefrom information conveying the parameter associated with the test object. In some embodiments, processing the digital TDM signal can include demultiplexing the digital TDM signal.

In accordance with another aspect, there is provided an electromagnetic inspection system for nondestructive testing of a test object, the electromagnetic inspection system including:
an emitter unit configured to generate an excitation signal to induce an electromagnetic response from the test object;
a receiver unit including a plurality of sensors configured to sense the electromagnetic response induced from the test object and generate a respective plurality of response signals from the sensed electromagnetic response; and
a readout circuit including:
a plurality of anti-aliasing filters, each anti-aliasing filter being configured to receive the response signal from a respective one of the sensors and to bandlimit the respective response signal to produce a respective one of a plurality of bandlimited signals; and
a time-division multiplexer coupled to the plurality of anti-aliasing filters and configured to multiplex the plurality of bandlimited signals into a time-division multiplexed (TDM) signal, the TDM signal including a sequence of frames outputted at a TDM frame rate, each frame including a plurality of time slots, each time slot being assigned to a respective one of the plurality of bandlimited signals,
wherein the plurality of anti-aliasing filters is configured to operate based on the TDM frame rate to attenuate aliasing artifacts in the TDM signal.

In some embodiments, the excitation signal generated by the emitter unit is a time-varying magnetic field, the electromagnetic response induced from the test object includes magnetic fields produced by eddy currents induced within the test object by the time-varying magnetic field generated by the emitter unit, and the plurality of response signals generated by the plurality of sensors conveys information about the eddy currents induced within the test object.

In some embodiments, the excitation signal includes a time-varying magnetic field having an excitation frequency ranging from about 2 Hz to about 20 kHz. In some embodiments, the excitation signal can include two or more excitation frequencies. In some embodiments, each response signal has a main signal component at the excitation frequency.

In some embodiments, the emitter unit includes a least one emitter coil. In some embodiments, the plurality of sensors includes a plurality of receiver coils.

In some embodiments, the electromagnetic inspection system is implemented as an eddy-current array probe, a remote-field array probe, a near-field array probe, or a combination thereof.

In some embodiments, the electromagnetic inspection system further includes an analog-to-digital converter implemented in or connected to the readout circuit, the analog-to-digital converter being configured to digitize the TDM signal into a digital TDM signal, and a processor configured to process the digital TDM signal to determine therefrom information conveying a characteristic of the test object. In some embodiments, the characteristic of the test object relates to a flaw, a dimensional parameter, a material property, or any combination thereof.

Other method and process steps may be performed prior, during, or after the steps described herein. The order of one or more steps may also differ, and some of the steps may be omitted, repeated, and/or combined, as the case may be.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIG. 1 is a schematic longitudinal view of an embodiment of an electromagnetic inspection system having an array probe arrangement configured for nondestructive testing of a test object.

FIG. 2 is a cross-sectional view of front elevation view of the electromagnetic inspection system of FIG. 1, taken along section line 2-2 in FIG. 1.

DETAILED DESCRIPTION

Figure 3:
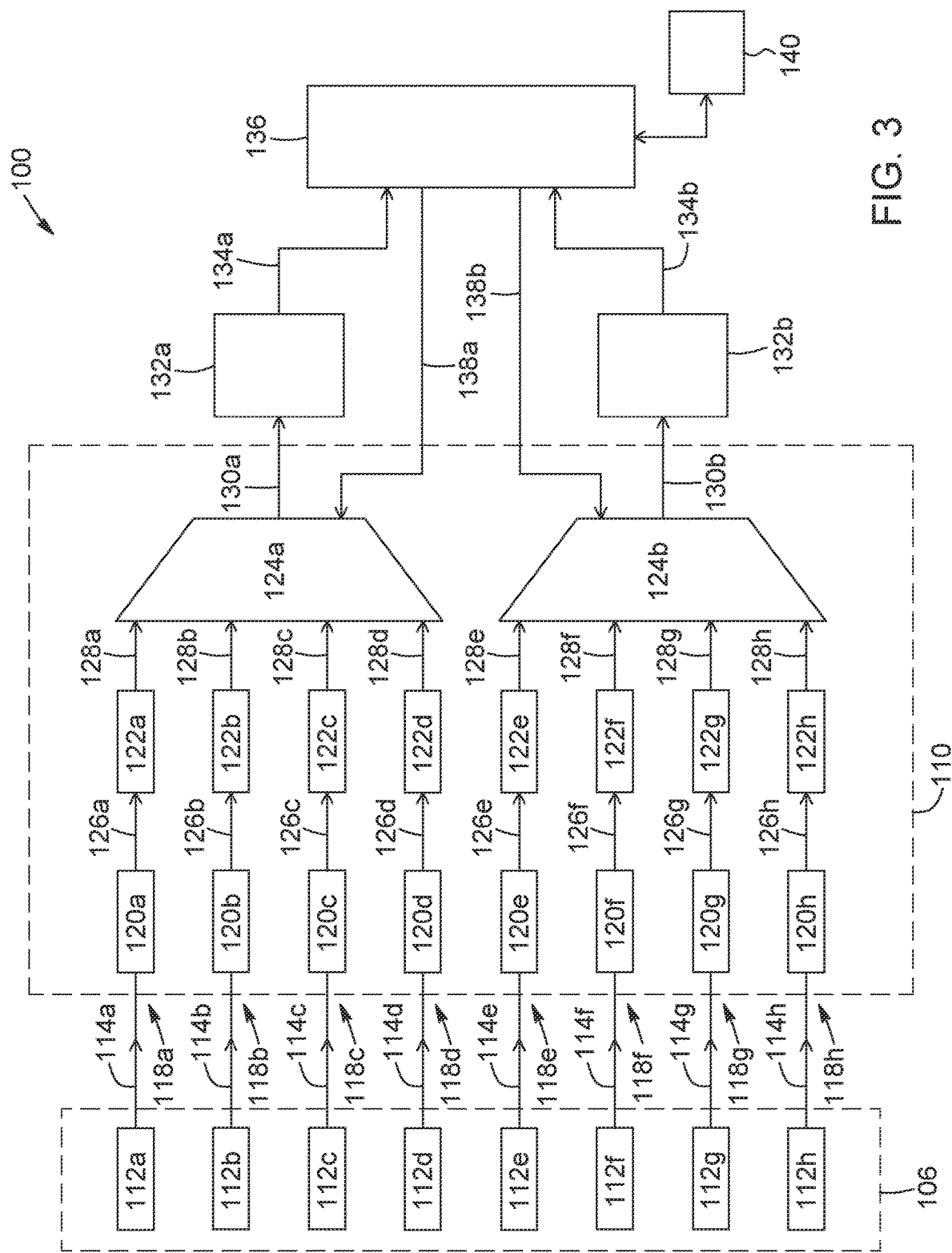
FIG. 3 is a schematic representation of the readout circuit and related components of the electromagnetic inspection system of FIG. 1.
Figure 4A:
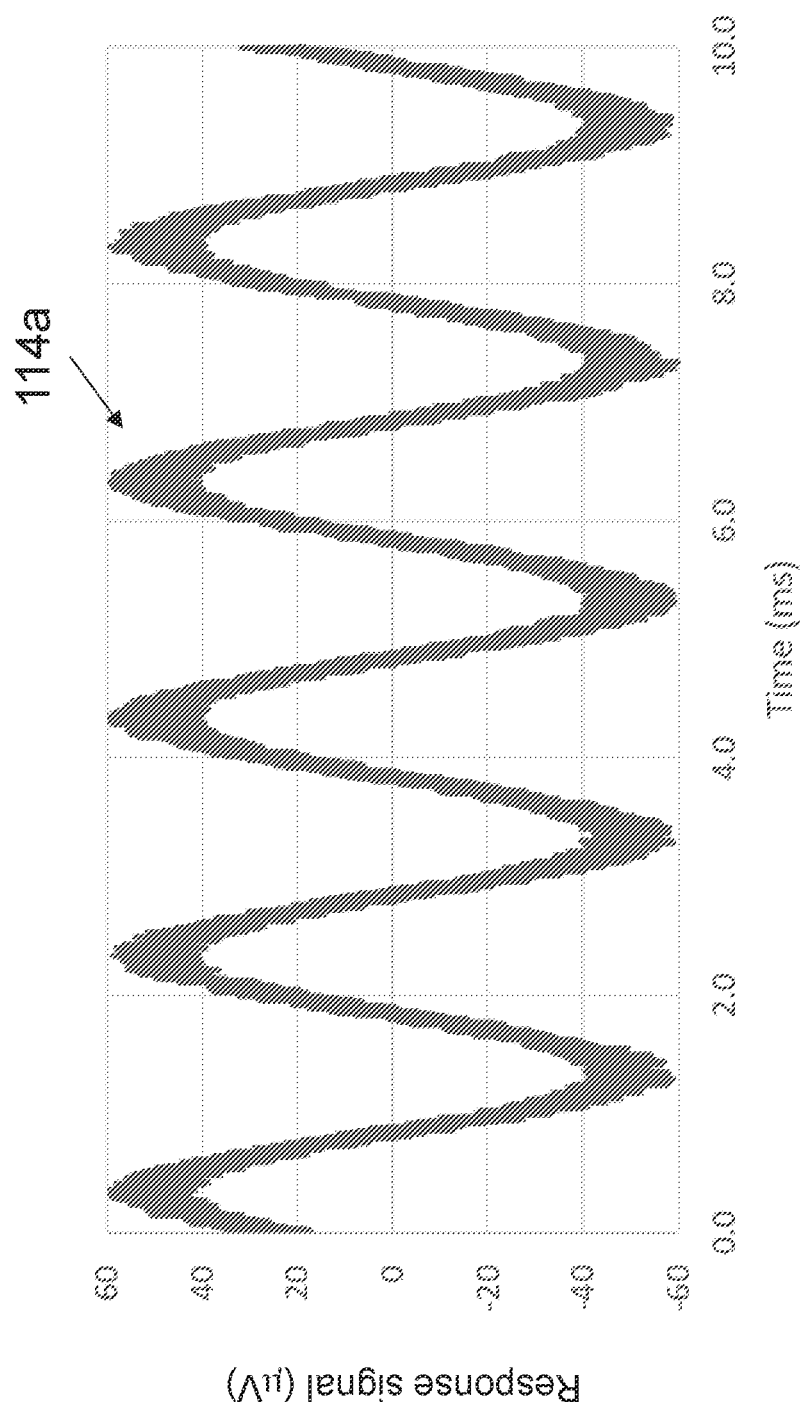
FIGS. 4A to 4D are graphs depicting curves of the response signals (in μV) generated by four different sensors an embodiment of an electromagnetic inspection system, plotted as functions of time and measured in response to a sinusoidal excitation signal of frequency equal to 500 Hz.
Figure 4B:
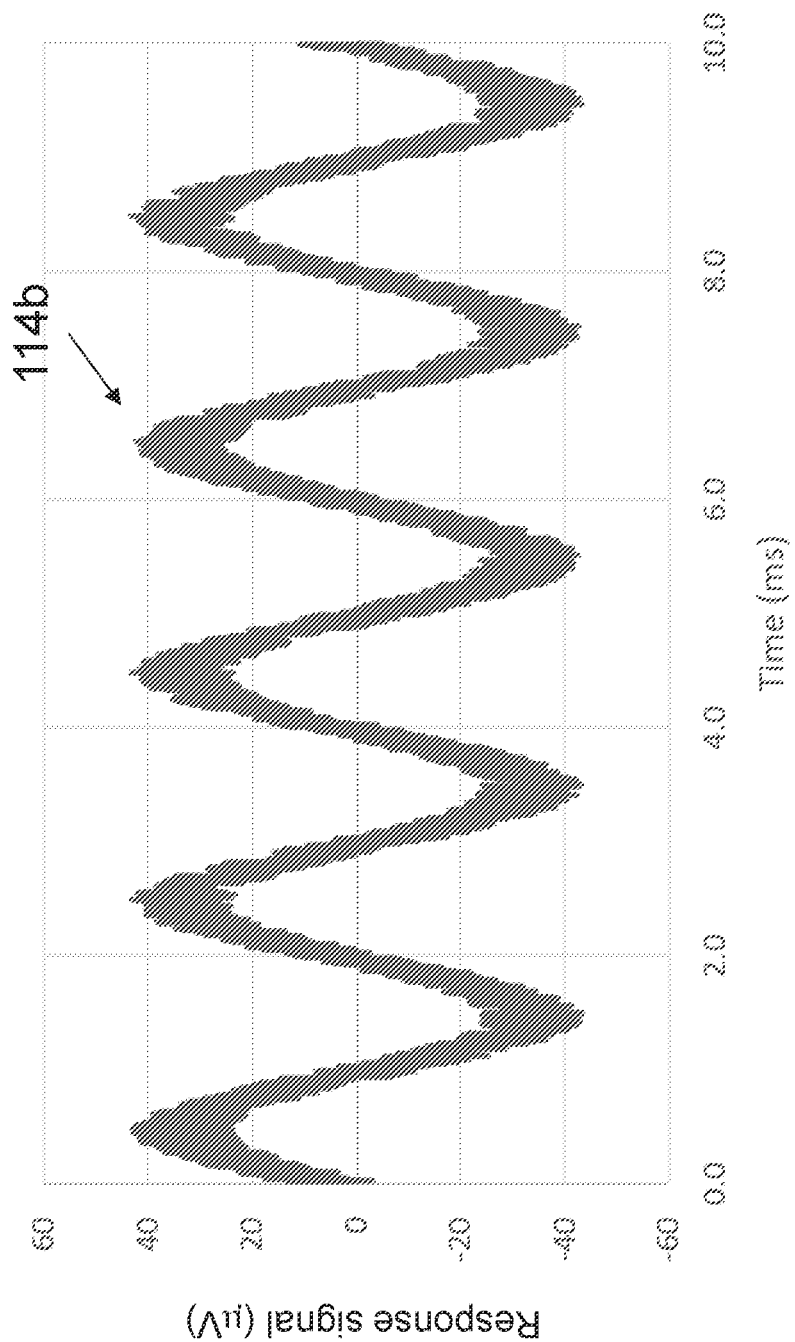
Figure 4C:
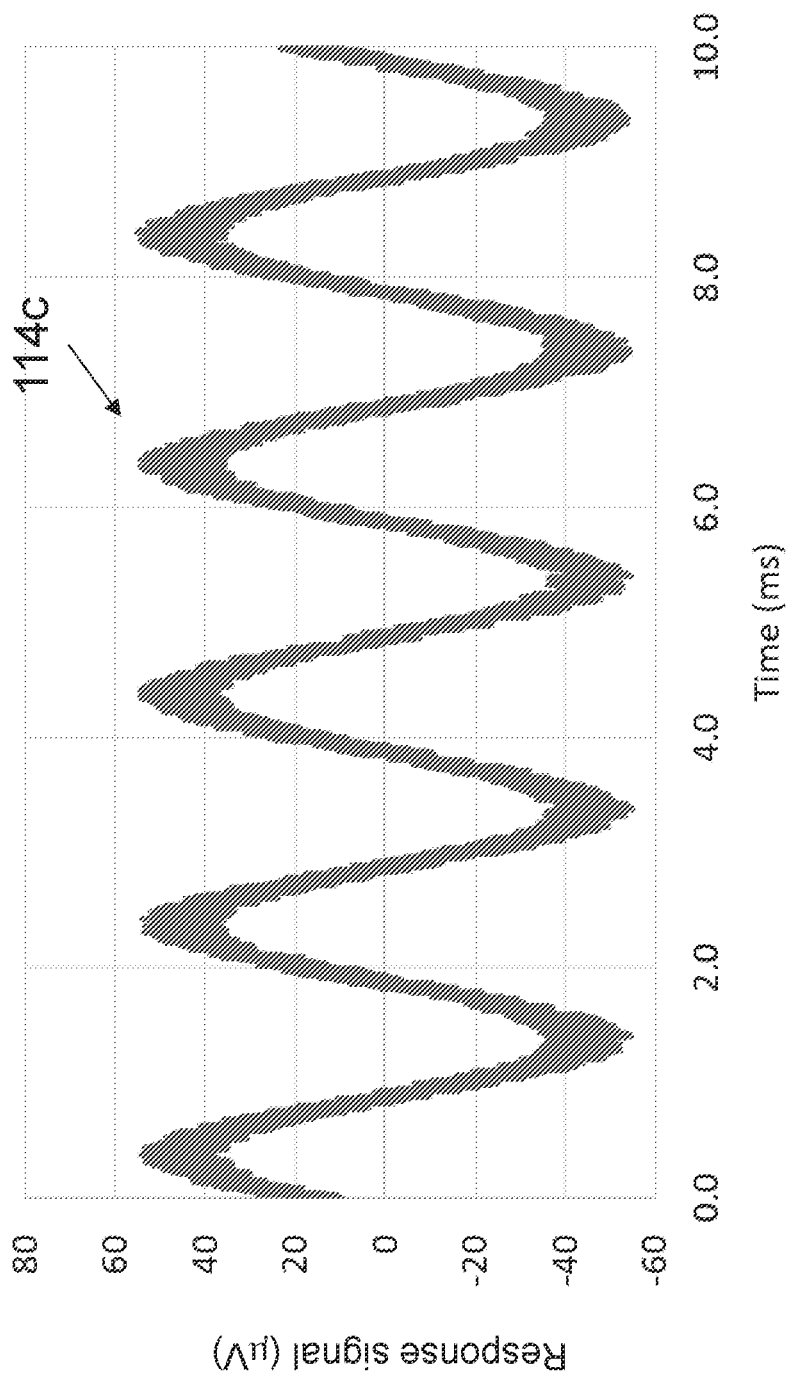
Figure 4D:
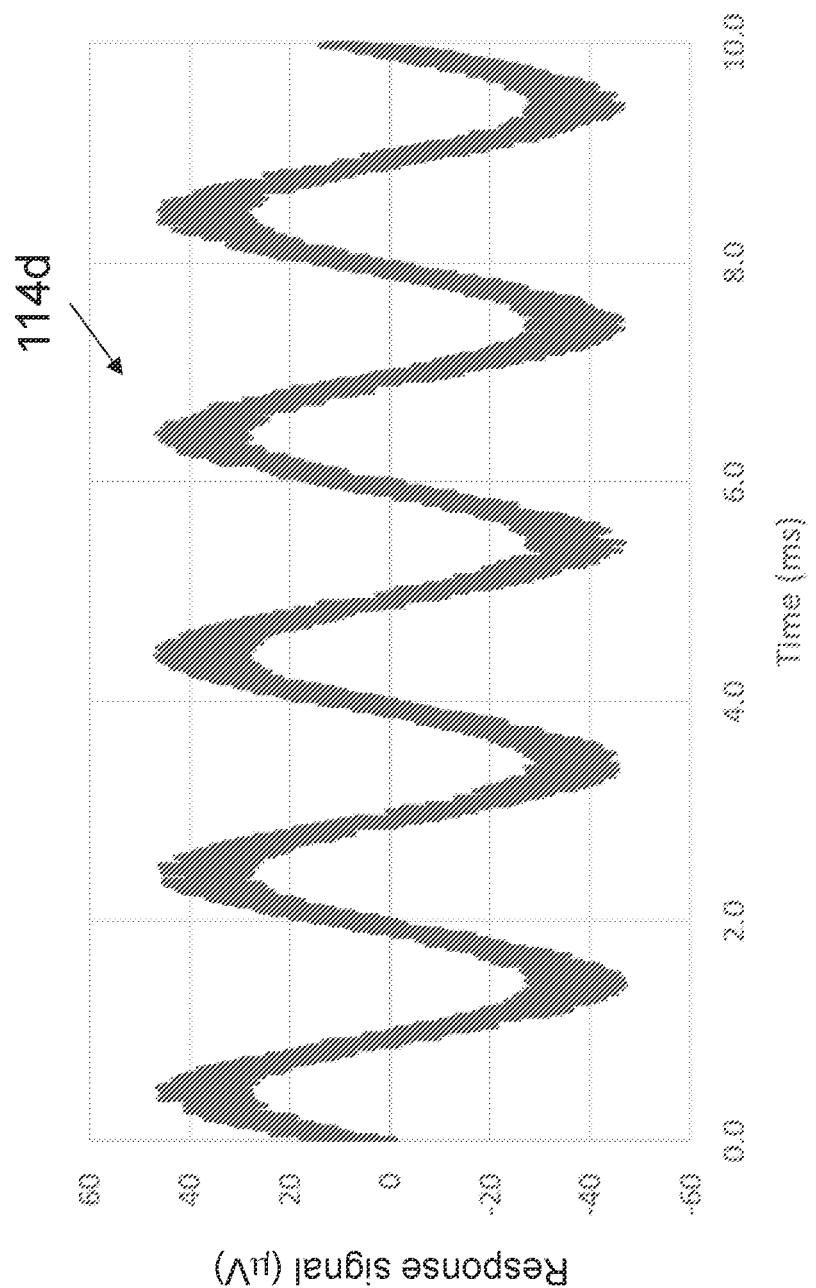

In the present description, similar features in the drawings have been given similar reference numerals. To avoid cluttering certain figures, some elements may not be indicated if they were already identified in a preceding figure. The elements of the drawings are not necessarily depicted to scale, since emphasis is placed on clearly illustrating the elements and structures of the present embodiments. Positional descriptors indicating the location and/or orientation of one element with respect to another element are used herein for ease and clarity of description. Unless otherwise indicated, these positional descriptors should be taken in the context of the figures and should not be considered limiting. Such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application and/or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of +10% of the stated value. It is noted that all numeric values used herein are assumed to be modified by the term "about", unless stated otherwise. The term "between" as used herein to refer to a range of numbers or values defined by endpoints is intended to include both endpoints, unless stated otherwise.

The term "based on" as used herein is intended to mean "based at least in part on", whether directly or indirectly, and to encompass both "based solely on" and "based partly on". In particular, the term "based on" may also be understood as meaning "depending on", "in accordance with", "representative of", "indicative of", "associated with", "relating to", and the like.

The terms "match", "matching", and "matched" refer herein to a condition in which two elements are either the same or within some predetermined tolerance of each other. That is, these terms are meant to encompass not only "exactly" or "identically" matching the two elements but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between elements may be mechanical, optical, electrical, magnetic, thermal, chemical, logical, fluidic, operational, or any combination thereof.

The term "concurrently" refers herein to two or more processes that occur during coincident or overlapping time periods. The term "concurrently" does not necessarily imply complete synchronicity and encompasses various scenarios including time-coincident or simultaneous occurrence of two processes; occurrence of a first process that both begins and ends during the duration of a second process; and occurrence of a first process that begins during the duration of a second process, but ends after the completion of the second process.

The present description generally relates to multiplexing readout techniques for electromagnetic inspection array probes and systems.

Electromagnetic testing encompasses a wide group of nondestructive analysis techniques for evaluating materials by applying electric currents and/or magnetic fields to a test object, and by measuring an electromagnetic response from the test object to yield information about its integrity, composition, structure, or condition. Various types of electromagnetic testing methods exist that can implement the techniques disclosed herein. Non-limiting examples include eddy-current testing (ECT), remote-field testing (RFT), near-field testing (NFT), pulsed-eddy-current testing (PECT), alternating current field measurement (ACFM), and magnetic flux leakage (MFL). Several of these methods (e.g., RFT, NFT, PECT, and ACFM) are variants and derivatives of ECT, since they are based on the eddy current effect. It is appreciated that while some embodiments of the present techniques can be used in ECT and its variants and derivatives, other embodiments may be implemented for use in electromagnetic testing methods that do not rely on the eddy current effect (e.g., MFL). It is also appreciated that the theory, instrumentation, and operation of electromagnetic testing methods (including ECT, RFT, NFT, and other eddy-current-based methods) are generally known in the art and need not be described in detail herein other than to facilitate an understanding of the present techniques.

Various aspects, features, and implementations of the present techniques are described below with reference to the figures.

Referring to FIGS. 1 to 3, there are illustrated schematic representations of a possible embodiment of an electromagnetic inspection system 100 having an array probe arrangement configured for nondestructive testing of a test object 102. In this embodiment, the electromagnetic inspection system 100 is configured as a remote-field array (RFA) probe, and the test object 102 is an electrically conducting tube (e.g., a steel tube). The inspection system 100 generally includes an emitter unit 104, a receiver unit 106, a drive circuit 108, and a readout circuit 110. The structure, configuration, and operation of these and other possible components of the inspection system 100 are described in greater detail below. It is appreciated that FIGS. 1 to 3 are simplified schematic representations that aim to illustrate a number of components of the electromagnetic inspection system 100 and its environment, such that additional features and components that may be useful or necessary for its practical operation may not be specifically depicted. Non-limiting examples of such additional features and components can include, to name a few, power supplies, mechanical and electrical connections, signal processors, and other hardware and equipment.

The emitter unit 104 is configured to generate an excitation signal. The excitation signal interacts with the test object 102 to induce an electromagnetic response from the test object 102. In some embodiments, the emitter unit 104 can include one or more emitters (e.g., at least one emitter coil). The drive circuit 108 is configured to generate a drive signal for driving the emitter unit 104 to generate the excitation signal. In the illustrated embodiment, the excitation signal generated by the emitter unit 104 is a time-varying magnetic field, the drive signal generated by the drive circuit 108 is a time-varying electrical signal (e.g., a time-varying drive voltage or current), and the electromagnetic response from the test object 102 includes time-varying magnetic fields created by eddy currents induced within the test object 102 upon application of the excitation signal. In some embodiments, the excitation signal may be a periodic signal (e.g., a sinusoidal signal) oscillating at an excitation frequency $f_{ex}$. In some embodiments, the excitation frequency $f_{ex}$ can range from about 2 Hz to about 20 kHz, although excitation frequency values outside this range are possible in other embodiments. In other embodiments, different and/or more complex excitation signals can be used. For example, the excitation signal can be a combination of multiple excitation signal components (e.g., sinusoidal or other types of periodic signal components) having different main excitation frequencies. In yet other embodiments, the excitation signal may be a DC signal. It is appreciated that various types of emitter units and associated drive circuits exist, including in eddy-current-based electromagnetic testing such as ECT, RFT, and NFT, and can be used in the embodiments disclosed herein.

The receiver unit 106 includes a plurality of receivers or sensors 112a-112h (e.g., magnetic sensors) configured to sense the electromagnetic response from the test object 102 due to the induced eddy currents. The plurality of sensors 112a-112h is configured to generate a respective plurality of response signals 114a-114h from the sensed electromagnetic response. In some embodiments, each response signal 114a-114h has a main signal component at the frequency $f_{ex}$ of the excitation signal applied by the emitter unit 104, although different and/or more complex response signals are possible in other embodiments. In addition to the magnetic fields produced by the eddy currents induced within the test object 102, the plurality of sensors 112a-112h may also pick up part of the magnetic field produced by the emitter unit 104 and other nearby sources of magnetic fields.

In the illustrated embodiment, the plurality of sensors 112a-112h includes eight receiver coils disposed in an azimuthally distributed arrangement around a longitudinal axis 116 of the inspection system 100, and the plurality of response signals 114a-114h includes eight time-varying complex electrical signals (e.g., time-varying voltages or currents) conveying information about the response of the test object 102 to the excitation signal, for example, about the eddy currents induced within the test object 102. For example, in some embodiments, variations in the magnitude and/or phase of the induced eddy currents can be determined from the response signals 114a-114h to yield information about flaws present in the test object 102. It is appreciated that the receiver unit 106 can include fewer or more than eight sensors 112a-112h in other embodiments, for example, between two and 128. In other embodiments, sensors different from receiver coils can be used. Non-limiting examples include magnetic sensors, such as Hall effect sensors, anisotropic magnetoresistance sensors (AMR), giant magnetoresistance (GMR) sensors, and tunneling magnetoresistance (TMR) sensors. In RFT, the longitudinal separation between the emitter unit 104 and the receiver unit 106 is generally of the order of two to three times the inner diameter of the test object 102 (e.g., the tube). Such a configuration allows the magnetic fields produced by the eddy currents induced within the test object 102 to be picked up by the receiver unit 106 along an indirect coupling path 144, which is a path that travels outwardly through the tube wall, along the outside of the tube, and back through the tube wall before reaching the receiver unit 106. It is appreciated that the operating principles and instrumentation of RFT are generally known in the art and need not be described in detail herein.

Referring to FIGS. 4A to 4D, there are depicted four examples of typical response signals 114a-114d generated by four different sensors 112a-112d of the receiver unit 106 in response to an excitation signal having a sinusoidal waveform of frequency $f_{ex}$ equal to 500 Hz (i.e., a period of 2 μs). The response signals 114a-114d are plotted as functions of time. Each one of the response signals 114a-114d has a main sinusoidal component at 500 Hz, to which is superimposed a random noise component of about 20 μV peak-to-peak. The random noise may be due to intrinsic electronic noise produced by the sensors 112a-112d or to nearby sources of magnetic fields. The response signals 114a-114d have slightly different amplitudes and phase delays to represent the fact that the magnetic fields picked up by the different sensors 112a-112d are generally different from one another.

Returning to FIG. 3, the readout circuit 110 is electrically coupled to the receiver unit 106 to receive and process the plurality of response signals 114a-114h generated by the plurality of sensors 112a-112h. In the illustrated embodiment, the readout circuit 110 generally includes a plurality of input circuit ports 118a-118h, a plurality of amplifiers 120a-120h, a plurality of anti-aliasing filters 122a-122h, and a pair of multiplexers 124a-124b. The structure, configuration, and operation of these and other possible components of the readout circuit 110 are described in greater detail below.

Each one of the plurality of input circuit ports 118a-118h is configured to receive the response signal 114a-114h from a respective one of the plurality of sensors 112a-112h. The input circuit ports 118a-118h can include any suitable type of electrical connections or coupling elements capable of receiving the plurality of response signals 114a-114h from the plurality of sensors 112a-112h.

Each one of the plurality of amplifiers 120a-120h is coupled to a respective one of the plurality of sensors 112a-112h via a respective one of the plurality of input circuit ports 118a-118h. The amplifiers 120a-120h can be embodied by operational amplifiers or any other suitable types of amplifier devices or circuits. In the illustrated embodiment, each amplifier 120a-120h is configured to amplify the respective response signal 114a-114h by a certain gain factor prior to the respective response signal 114a-114h reaching the respective anti-aliasing filter 122a-122h. It is appreciated that amplifying the response signals 114a-114h prior to further processing in the readout circuit 110 may be advantageous or required in RFT implementations, where the magnitudes of the response signals 114a-114h can be relatively weak.

In some embodiments, in order to achieve a maximum or suitably high signal-to-noise ratio, the gain factor of each amplifier 120a-120h may be set to the highest value that does not result in undesirable signal distortions in the amplified signals 126a-126h received by the anti-aliasing filters 122a-122h in scenarios when the response signals 114a-114h produced by the sensors 112a-112h are at their maximum expected magnitudes. For example, if the maximum expected magnitude for the response signals 114a-114h is about 1 mV, the highest magnitude for the amplified signals 126a-126h that does not result in signal distortions is about 50 mV, and the DC offset and noise produced by each amplifier 120a-120h amount to about 15 mV, then the maximum gain factor, $G_{max}$, of each amplifier 120a-120h may be computed as follows:

$$G_{max} = \frac{\text{Max amplified signal} - \text{Amplifier added signal}}{\text{Max sensor signal}} = \frac{50 \text{ mV} - 15 \text{ mV}}{1 \text{ mV}} = 35 \text{ V/V}. \quad (1)$$

Figure 5:
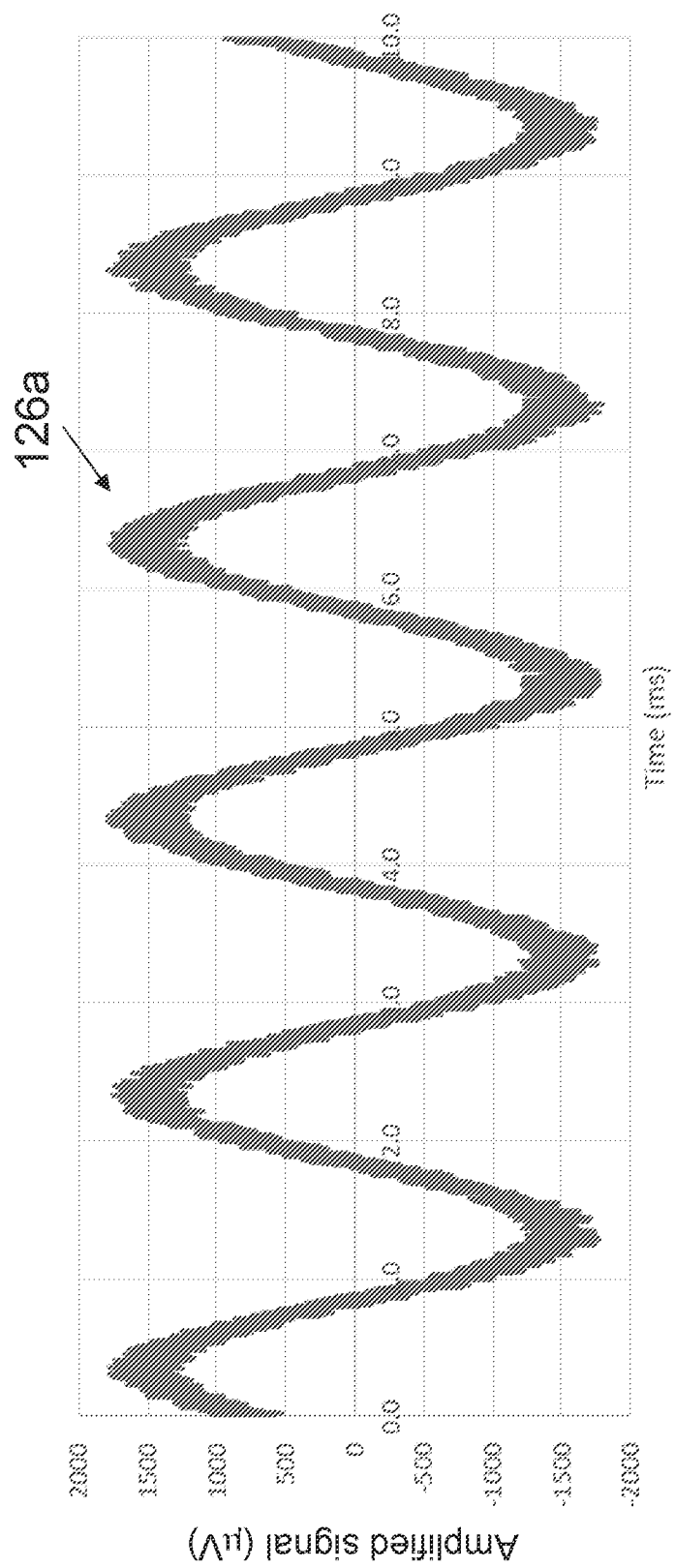
FIG. 5 is a graph depicting a curve of an amplified signal generated by amplifying the response signal of FIG. 4A by a gain factor of 30 V/V.

In practical applications, one could decide to set the gain factor of the amplifiers 120a-120h to a more conservative value that is slightly less than $G_{max}$, for example, 30 V/V. Referring briefly to FIG. 5, there is depicted an example of an amplified signal 126a generated by amplifying the response signal 114a of FIG. 4A by a gain factor of 30 V/V.

Returning to FIGS. 1 to 3, in some embodiments, the ratio between the output impedance of the sensors 112a-112h and the input impedance of the amplifiers 120a-120h may be set or adjusted to a suitable value depending on the targeted flaw measurement accuracy requirements of a particular application. For example, in some embodiments, an impedance ratio equal to or less than 0.2 may be acceptable, while other embodiments may require or benefit from a lower impedance ratio, for example, equal or less than 0.01. It is appreciated that controlling the impedance ratio between the sensors 112a-112h and the amplifiers 120a-120h can be desirable or required in some embodiments in order to reduce the attenuation and phase shift of the response signals 114a-114h that could be caused by the input impedance of the amplifiers 120a-120h.

Figure 6:
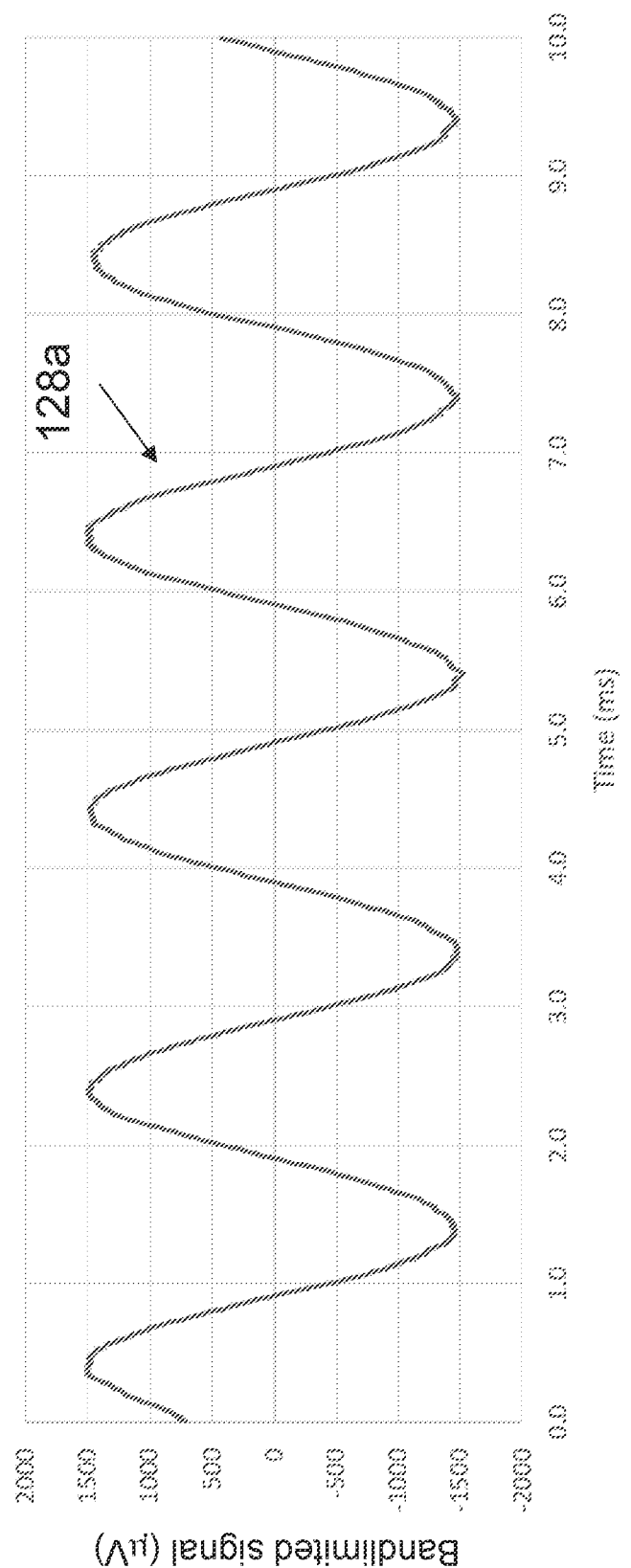
FIG. 6 is a graph depicting a curve of a bandlimited signal generated by bandlimiting the amplified signal of FIG. 5 using a first-order Butterworth low-pass filter having with cutoff frequency equal to 2.5 kHz.

Each one of the plurality of anti-aliasing filters 122a-122h in FIG. 3 is configured to bandlimit a respective one of the plurality of amplified signal 126a-126h to produce a respective one of a plurality of bandlimited signals 128a-128h. Depending on the application, the anti-aliasing filters 122a-122h may be passive or active filters. In the present description, the term "bandlimiting" generally refers to a spectral filtering operation of limiting the spectral density of a signal to substantially zero above a certain frequency, so as to obtain a bandlimited signal. Depending on the application, the bandlimited signal may be a bandlimited baseband signal (lower-bound frequency of bandwidth equal to zero) or a bandlimited band-pass signal (lower-bound frequency of bandwidth different from zero). Referring briefly to FIG. 6, there is depicted an example of a bandlimited signal 128a generated by bandlimiting the amplified signal 126a of FIG. 5 using a first-order Butterworth low-pass filter having with cutoff frequency equal to 2.5 kHz. It is appreciated that the bandlimited signal 128a in FIG. 6 is noticeably less noisy than the amplified signal 126a in FIG. 5.

Returning to FIGS. 1 to 3, in the present description, the term "aliasing" refers to an effect that causes signal components at different frequencies to become undistinguishable from one another when sampled (e.g., as a result of a TDM operation). Aliasing results in higher-frequency signal components appearing as lower-frequency signal components. Aliasing leads to signal distortion, referred to herein as aliasing artifacts, when a sampled signal is reconstructed from its samples. Aliasing can result from sampling a high frequency signal at a sampling rate that is too low. As described in greater detail below, the anti-aliasing filters 122a-122h are configured to operate based on a TDM frame rate $f_{TDM}$ of the multiplexers 124a-124b in order to attenuate, if not eliminate, aliasing artifacts in the TDM signal 130a-130b outputted by the multiplexers 124a-124b.

The readout circuit 110 includes a first multiplexer 124a and a second multiplexer 124b, each of which configured to implement a TDM operation. The TDM operation involves temporally sampling and interleaving, at a TDM frame rate $f_{TDM}$, a respective subset of the plurality of bandlimited signals 128a-128h. The first multiplexer 124a is coupled to a first subset of anti-aliasing filters 122a-122d and configured to multiplex a corresponding first subset of bandlimited signals 128a-128d into a first TDM signal 130a. The first TDM signal 130a includes a time sequence of frames repeating at the TDM frame rate $f_{TDM}$, each frame having four time slots corresponding respectively to the first subset of bandlimited signals 128a-128d. Specifically, each frame of the first TDM signal 130a includes a first time slot assigned to the first bandlimited signal 128a, a second time slot assigned to the second bandlimited signal 128b, a third time slot assigned to the third bandlimited signal 128c, and a fourth time slot assigned to the second bandlimited signal 128d. The second multiplexer 124b is coupled to a second subset of anti-aliasing filters 122e-122h and configured to multiplex a corresponding second subset of bandlimited signals 128e-128h into a second TDM signal 130b. The second TDM signal 130b includes a time sequence of frames repeating at a TDM frame rate, each frame having four time slots corresponding respectively to the second subset of bandlimited signals 128c-128h. Specifically, each frame of the second TDM signal 130b includes a first time slot assigned to the fifth bandlimited signal 128e, a second time slot assigned to the sixth bandlimited signal 128f, a third time slot assigned to the seventh bandlimited signal 128g, and a fourth time slot assigned to the eighth bandlimited signal 128h.

The first and second multiplexers 124a-124b can each be embodied by any suitable types of multiple-input, single-output electronic switches or devices capable of implementing a TDM scheme as described herein. Depending on the application, the first and second multiplexers 124a-124b may or may not be identical to each other. In some embodiments, the TDM frame rate $f_{TDM}$ at which the first and second multiplexers 124a-124b are operated can range between about 10-20 kHz and about 500 kHz, although TDM frame rate values outside this range can be used in other embodiments. In the illustrated embodiment, the readout circuit 110 includes two multiplexers 124a-124b, each of which being connected to four anti-aliasing filters 122a-122d, 122e-122h. However, in other embodiments, the readout circuit 110 may include a single multiplexer or more than two multiplexers, and each multiplexer may be connected to any plural number anti-aliasing filters, for example, between two and sixteen, or between eight and 128. It is appreciated that the theory, instrumentation, and operation of time-division multiplexers, notably in the context of the eddy-current-based and other electromagnetic testing methods, are generally known in the art and need not be described in detail herein other than to facilitate an understanding of the present techniques.

Figure 7A:
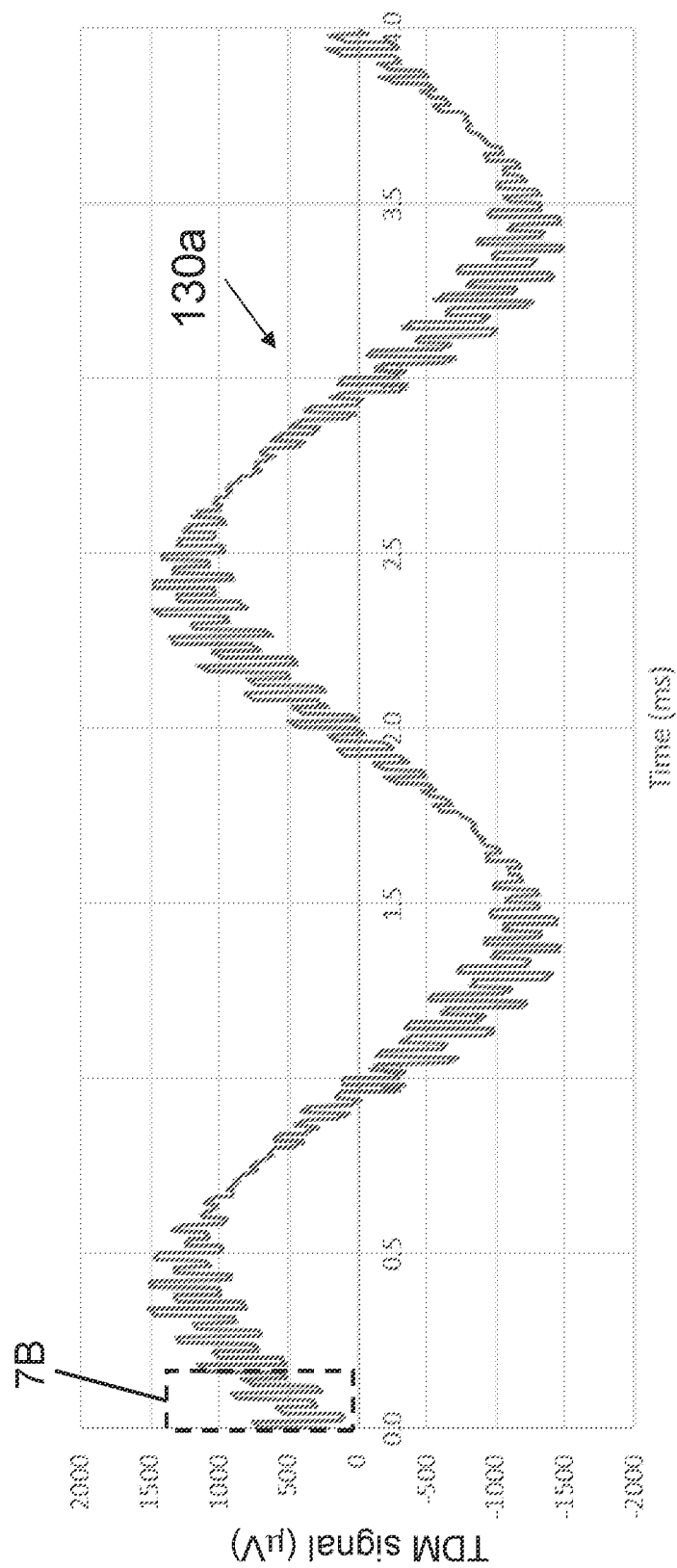
FIG. 7A is a graph depicting a curve of a time-division multiplexed signal generated by multiplexing four bandlimited signals at a TDM frame rate of 12.5 kHz, plotted as a function of time. The four bandlimited signals were obtained by amplifying and bandlimiting the four response signals depicted in FIGS. 4A to 4D.
Figure 7B:
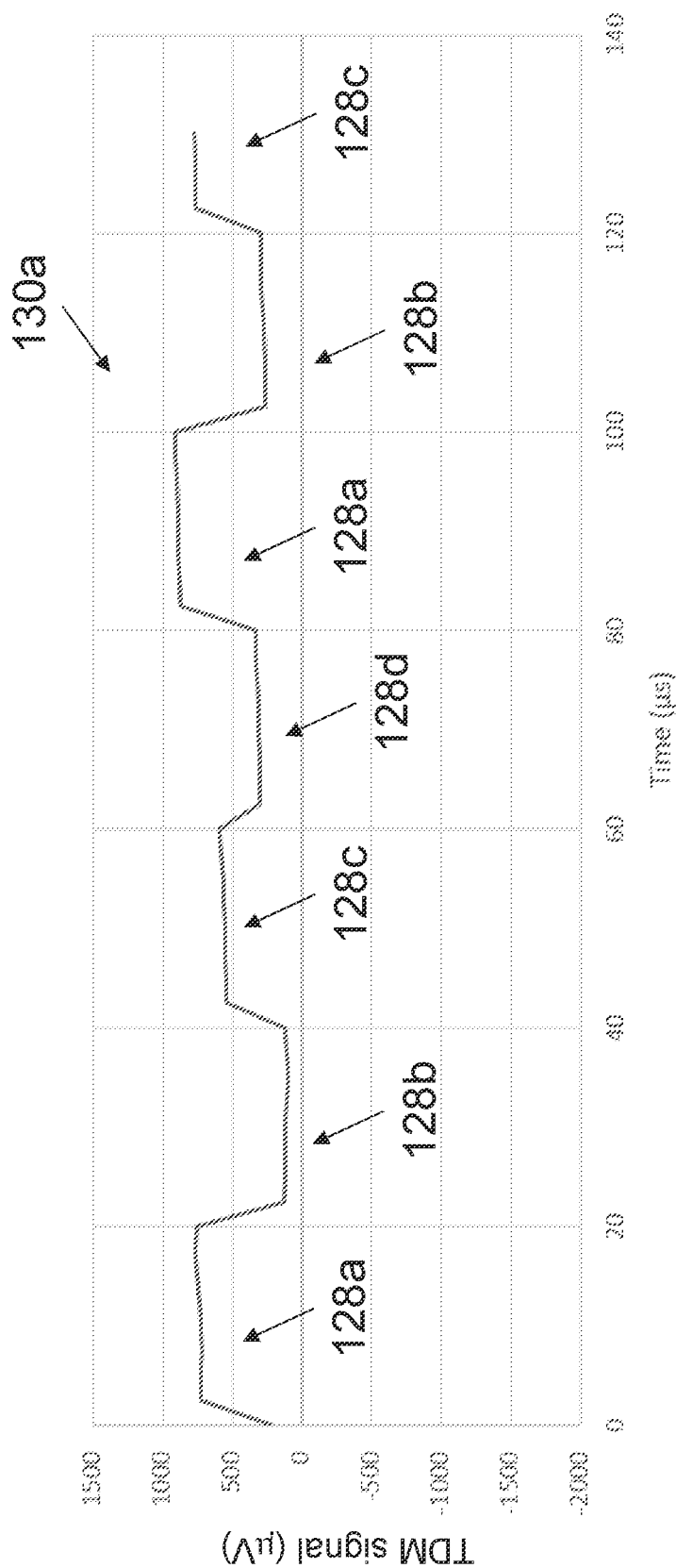
FIG. 7B is a zoomed-in view of the first 130 μs of FIG. 7A.

FIG. 7A depicts an example of a TDM signal 130a generated by multiplexing four bandlimited signals 128a-128d at a TDM frame rate of 12.5 kHz, corresponding to a TDM frame duration of 80 µs, where the four bandlimited signals 128a-128d have been obtained by amplifying and bandlimiting the response signals 114a-114d depicted in FIGS. 4A to 4D. FIG. 7B is a zoomed-in view of the first 130 µs of FIG. 7A. It is seen that during each TDM frame of duration 80 µs, the first, second, third, and fourth bandlimited signals 128a, 128b, 128c, 128d are sampled during first, second, third, and fourth time slots of the TDM frame, respectively, where each time slot has a time slot duration of 20 µs.

Returning to FIGS. 1 to 3, it is appreciated that the TDM operation performed by the multiplexer 124a-124b may produce aliasing artifacts in the multiplexed signals 130a-130b. The aliasing artifacts thus produced can in turn adversely affect the operation of the readout circuit 110 as well as the accuracy, reliability, and overall performance of the inspection system 100. In some embodiments, when the emitter unit 104 applies an excitation signal having an excitation frequency $f_{ex}$ to the test object 102, the response signals 114a-114h can be expected to have a main signal component at $f_{ex}$, and likewise for the amplified signals 126a-126h and the bandlimited signals 128a-128h successively obtained from the response signals 114a-114h. However, the multiplexers 124a-124b can introduce unwanted aliasing artifacts in the TDM signals 130a-130b, which can be attenuated, if not avoided, by providing the anti-aliasing filters 122a-122h and configuring their operation in accordance with the TDM frame rate $f_{TDM}$.

When a response signal having a signal component of interest at frequency $f_{ex}$ is sampled at a TDM frame rate $f_{TDM}$, the presence of signal components at $f_{al,N}=|f_{ex}-Nf_{TDM}|$, $N \in \mathbb{Z}^*$, in the response signal can produce unwanted aliases in the TDM signal by folding over onto the spectrum of the signal component of interest at frequency $f_{ex}$. These aliases yield sets of samples that are identical to those of the signal component of interest at $f_{ex}$, which can adversely affect the process of reconstructing the signal component of interest at $f_{ex}$ from the samples of the TDM signal. It is appreciated that all of those unwanted aliasing signal components in the response signal are at frequencies $f_{al,N}$ equal to or higher than $(f_{TDM}-f_{ex})$. This means that by bandlimiting the response signal to at most $(f_{TDM}-f_{ex})$ before carrying out the TDM operation, aliasing artifacts at $f_{ex}$ can be reduced, if not suppressed.

In some embodiments, the anti-aliasing filters 122a-122h in FIG. 3 are configured to attenuate the amplified signals 126a-126h at frequencies above an attenuating frequency $f_{att}$ equal to or less than $(f_{TDM}-f_{ex})$, but higher than $f_{ex}$ (e.g., higher than twice $f_{ex}$). For example, if $f_{TDM}=12.5$ kHz and $f_{ex}=500$ Hz, as in FIGS. 7A and 7B, then $f_{att}$ would equal to 12 kHz or less (but higher than 500 Hz). In other embodiments, a stricter condition may be used, for example, by setting the attenuating frequency $f_{att}$ equal to $f_{TDM}/2$ or less (but higher than $f_{ex}$). It is appreciated that the condition at which $f_{att}=f_{TDM}/2$ is called the Nyquist condition, and the frequency $f_{TDM}/2$ is called the Nyquist frequency.

In some embodiments, at least one of the anti-aliasing filters 122a-122h may be a low-pass filter, for example, a low-pass filter having a cutoff frequency that is equal to or less than half the TDM frame rate $f_{TDM}$ (but higher than $f_{ex}$). In some embodiments, the low-pass filter may be a first-order filter, while in other embodiments the low-pass filter may an n-order filter, wherein n is a positive integer greater than one. It is appreciated that any suitable type of low-pass filters may be used, non-limiting examples of which include Butterworth filters, Bessel filters, Chebyshev filters, Cauer filters, or combinations thereof.

In other embodiments, at least one of the anti-aliasing filters 122a-122h may be a band-pass filter, for example, band-pass filters having an upper cutoff frequency that is equal to or less than half the TDM frame rate $f_{TDM}$ (but higher than $f_{ex}$), and a lower cutoff frequency lower than $f_{ex}$, for example, ranging between 1 Hz (or another suitably low value) and slightly less than $f_{ex}$.

In some embodiments, each anti-aliasing filter 122a-122h may be configured to attenuate a magnitude of the respective one of the response signals 114a-114h by a certain attenuation factor at the attenuating frequency $f_{att}$. For example, if the anti-aliasing filters 122a-122h are embodied by first-order Butterworth low-pass filters, the attenuation function A(f) of the anti-aliasing filters 122a-122h can be written as follows:

$$A(f) = \left[1 - \frac{1}{\sqrt{1 + (f/f_c)^2}}\right] \times 100\%, \quad (2)$$

where $f_c$ is the cutoff frequency. In some embodiments, the cutoff frequency $f_c$ may be selected so as to achieve a sufficiently high level of attenuation at the attenuating frequency $f_{att}$ (e.g., at least 75%) while maintaining a sufficiently low level of attenuation at the excitation frequency $f_{ex}$ (e.g., at most 5%). For example, if $f_{ex}$=500 Hz, $f_{TDM}$=12.5 kHz, and $f_{att}$=($f_{TDM}$-$f_{ex}$)=12 kHz, then a cutoff frequency $f_c$ of 2.5 kHz would yield an attenuation factor A($f_{att}$)=79.60% at $f_{att}$, and an attenuation factor A($f_{ex}$)=1.94% at $f_{ex}$. Such attenuation factor values can prove acceptable in certain applications.

Referring still to FIGS. 1 to 3, the readout circuit 110 may include or be connected to analog-to-digital converters 132a-132b configured to digitize the TDM signals 130a-130b into digital TDM signals 134a-134b. Various types of analog-to-digital converters exist in the art and can be used in the present techniques.

The readout circuit 110 may also include or be connected to a processor 136 configured to process the digital TDM signals 134a-134b and determine therefrom information conveying a characteristic of the test object 102. The processing of the digital TDM signals 134a-134b can include a demultiplexing operation by one or more demultiplexers provided in the processor 136. The characteristic of the object can relate to a flaw (e.g., a crack or another defect), a dimensional parameter (e.g., a thickness measurement), a material property (e.g., an electrical conductivity or magnetic permeability measurement), or any combination thereof. The processor 136 may also be configured for controlling, monitoring, or coordinating functions and operations of various components of the inspection system 100. For example, the processor 136 may be configured to send control signals 138a-138b to the multiplexers 124a-124b to control their operation.

It is appreciated that while the processor 136 is depicted in the figures as a single entity for illustrative purposes, the term "processor" should not be construed as being limited to a single processing entity, and accordingly, any suitable processor architecture may be used. In some embodiments, the processor 136 may include a plurality of processing entities. Such processing entities may be physically located within the same device, or the processor 136 may represent the processing functionalities of a plurality of devices operating in coordination. For example, the processor 136 may include or be part of one or more of a computer: a microprocessor: a microcontroller: a central processing unit (CPU): a digital signal processor (DSP): a special-purpose programmable logic device embodied in hardware device, such as, for example, a field-programmable gate array (FPGA); and/or other mechanisms configured to electronically process information and to operate collectively as a processor. The processor 136 can be implemented in hardware, software, firmware, or any combination thereof. The processor 136 can be connected to various components of the inspection system 100 via wired and/or wireless communication links to send and/or receive various types of signals, such as timing and control signals, measurement signals, and data signals. The processor 136 may be controlled by direct user input and/or by programmed instructions, and may include an operating system for controlling and managing various functions of the inspection system 100. Depending on the application, the processor 136 may be fully or partly integrated with, or physically separate from the other hardware components of the inspection system 100. In some embodiments, the processor 136 may include a distributed and/or cloud computing network.

The inspection system 100 may also include a memory 140. The memory 140, which may also be referred to as a "computer readable storage medium" or "a computer readable memory" is configured to store computer programs and other data to be retrieved by the processor 136. The terms "computer readable storage medium" and "computer readable memory" refer herein to a non-transitory and tangible computer product that can store and communicate executable instructions for the implementation of various steps of the techniques disclosed herein. The memory 140 may be any computer data storage device or assembly of such devices, including a random-access memory (RAM): a dynamic RAM: a read-only memory (ROM); a magnetic storage device: an optical storage device: a flash drive memory; and/or any other non-transitory memory technologies. The memory 140 may be associated with, coupled to, or included in the processor 136, and the processor 136 may be configured to execute instructions contained in a computer program stored in the memory 140 and relating to various functions and operations associated with the processor 136. While the memory 140 is depicted in the figures as a single entity for illustrative purposes, the term "memory" should not be construed as being limited to a single memory entity, and accordingly, any known memory architecture may be used. In some embodiments, the memory 140 may include a plurality of memory entities. Such memory entities may be physically located within the same device, or the memory 140 can represent the functionalities of a plurality of devices operating in coordination.

In some embodiments, the inspection system 100 may also include one or more user interface devices (not shown) operatively connected to the processor 136 to allow the input of commands and queries to the system 100, as well as present the outcomes of the commands and queries. The user interface devices can include input devices (e.g., a touch screen, a keypad, and the like) and output devices (e.g., a display screen, visual and audible indicators, and the like).

Figure 8:
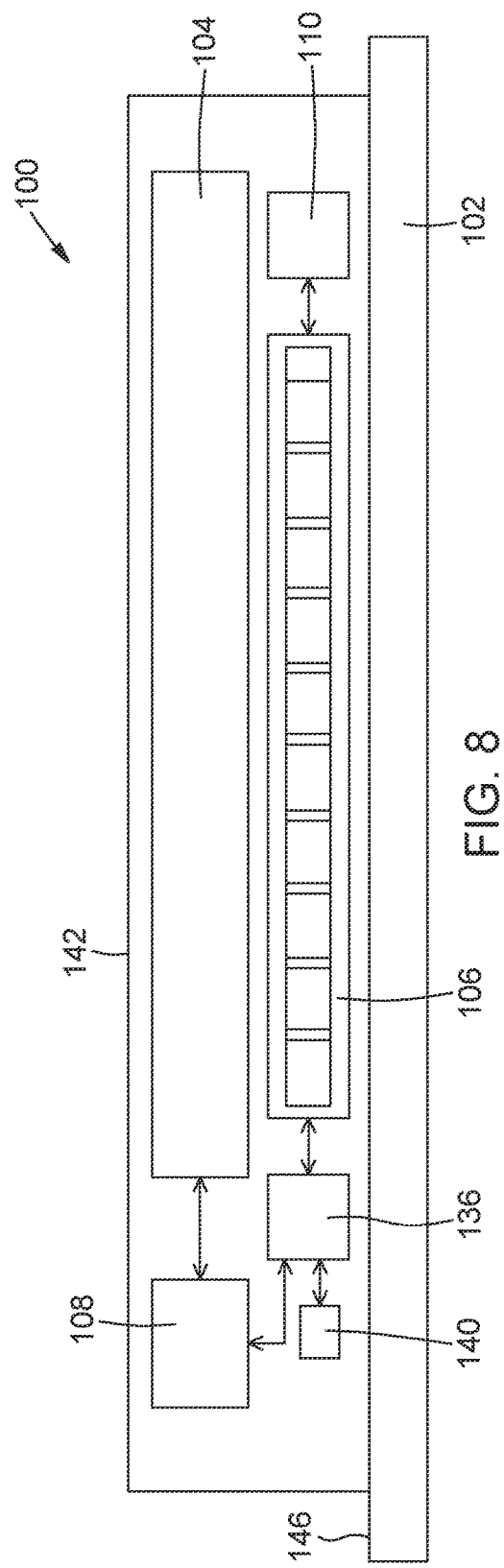
FIG. 8 is a schematic side elevation view of an embodiment of an electromagnetic inspection system having an array probe arrangement configured for nondestructive testing of a test object.
Figure 9:
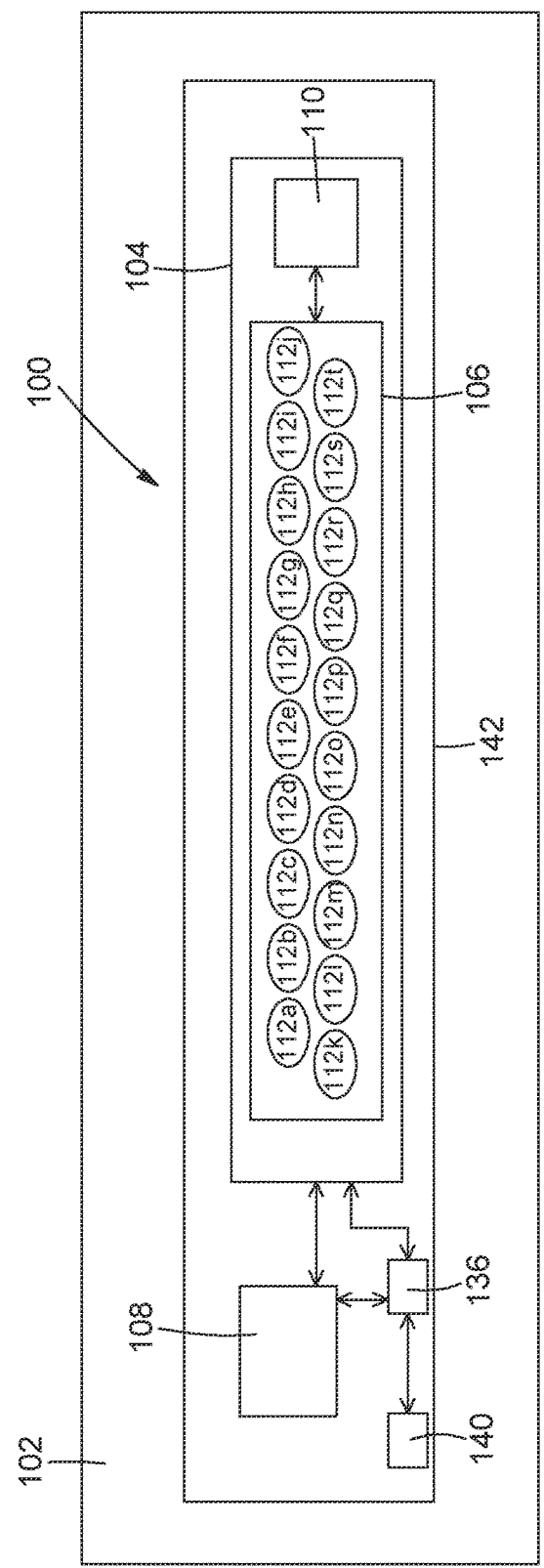
FIG. 9 is a schematic top view of the electromagnetic inspection system of FIG. 8.
Figure 10:
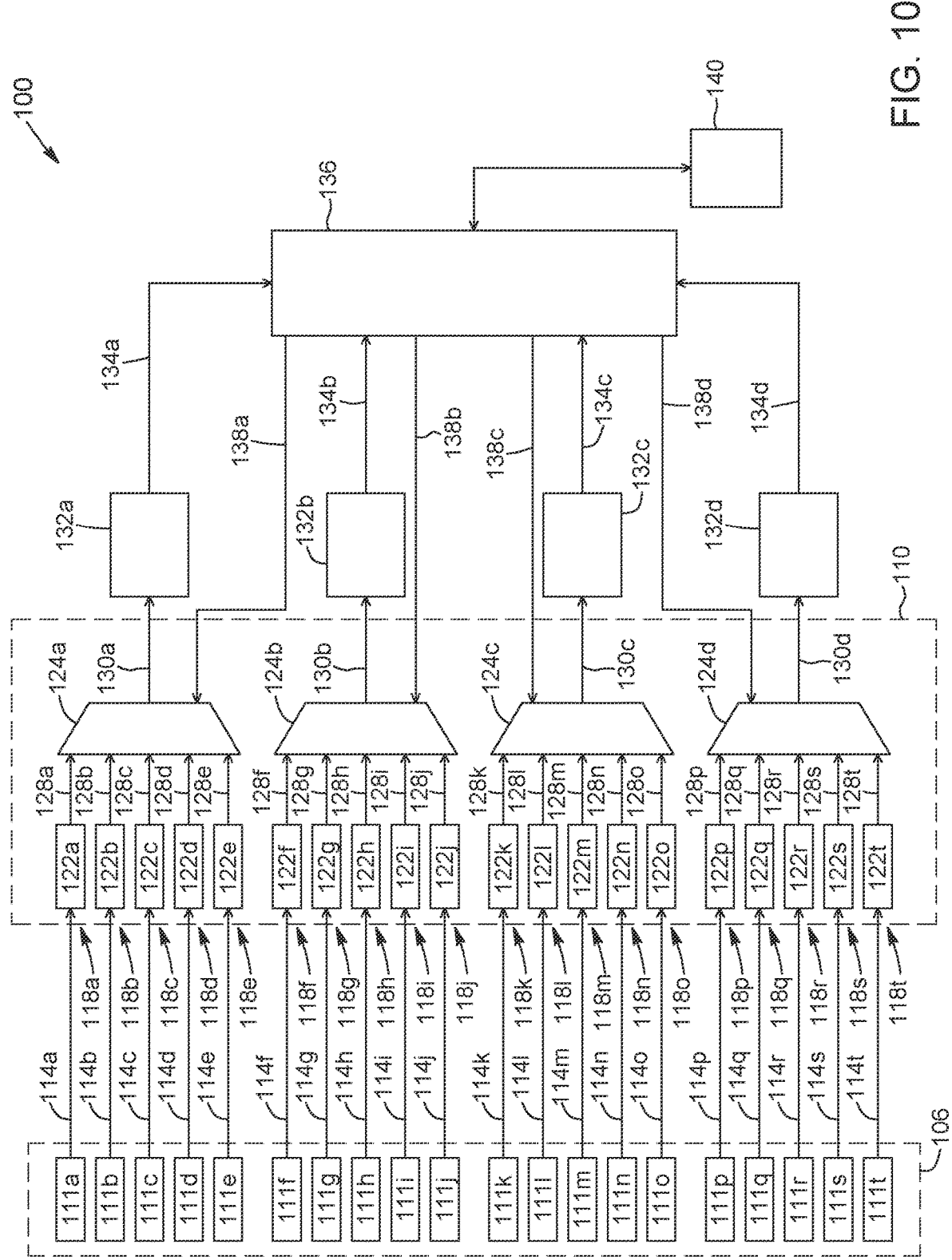
FIG. 10 is a schematic representation of the readout circuit and related components of the electromagnetic inspection system of FIG. 8.

Referring to FIGS. 8 to 10, there are illustrated schematic representations of another possible embodiment of an electromagnetic inspection system 100 configured for nondestructive testing of a test object 102. In this embodiment, the electromagnetic inspection system 100 is configured as an eddy-current array (ECA) probe, and the test object 102 under test is an electrically conducting plate. The embodiment of FIGS. 8 to 10 shares several features with the embodiment of FIGS. 1 to 3, which will not be described again other than to highlight differences between them. The inspection system 100 of FIGS. 8 to 10 generally includes an emitter unit 104, a receiver unit 106, a drive circuit 108, and a readout circuit 110, which are contained in a probe housing 142. In other embodiments, the drive circuit 108 and/or the readout circuit 110 may be disposed outside the probe housing 142 and connected to the emitter unit 104 and the receiver unit 106 via suitable connections (e.g., wired connections). It is appreciated that FIGS. 8 to 10, are simplified schematic representations that aim to illustrate a number of components of the electromagnetic inspection system 100, such that additional features and components that may be useful or necessary for its practical operation may not be specifically depicted. Non-limiting examples of such additional features and components can include, to name a few, power supplies, mechanical and electrical connections, signal processors, and other hardware and equipment.

The emitter unit 104 is configured to generate an excitation signal. The excitation signal interacts with the test object 102 to induce an electromagnetic response from the test object 102. In some embodiments, the emitter unit 104 can include one or more emitter coils (e.g., at least one emitter coil). The drive circuit 108 is configured to generate a drive signal for driving the emitter unit 104 to generate the excitation signal. In the illustrated embodiment, the excitation signal generated by the emitter unit 104 is a time-varying magnetic field, the drive signal generated by the drive circuit 108 is a time-varying electrical signal (e.g., a time-varying drive voltage or current), and the electromagnetic response from the test object 102 includes time-varying magnetic fields created by eddy currents induced within the test object 102 upon application of the excitation signal. In some embodiments, the excitation signal may be a periodic signal (e.g., a sinusoidal signal) oscillating at an excitation frequency $f_{ex}$. In some embodiments, the excitation frequency $f_{ex}$ can range from about 2 Hz to about 20 kHz, although excitation frequency values outside this range are possible in other embodiments. In other embodiments, different and/or more complex excitation signals can be used. For example, the excitation signal can be a combination of multiple excitation signal components (e.g., sinusoidal or other types of periodic signal components) having different main excitation frequencies. In yet other embodiments, the excitation signal may be a DC signal. It is appreciated that various types of emitter units and associated drive circuits exist, including in eddy-current-based electromagnetic testing such as ECT, RFT, and NFT, and can be used in the embodiments disclosed herein.

The receiver unit 106 includes a plurality of sensors 112a-112t (e.g., magnetic sensors, as mentioned above) configured to sense the electromagnetic response from the test object 102 due to the induced eddy currents. The plurality of sensors 112a-112t is configured to generate a respective plurality of response signals 114a-114t from the sensed electromagnetic response. In some embodiments, each response signal 114a-114t has a main signal component at the frequency $f_{ex}$ of the excitation signal applied by the emitter unit 104, although different and/or more complex response signals are possible in other embodiments. In addition to the magnetic fields produced by the eddy currents induced within the test object 102, the plurality of sensors 112a-112t may also pick up part of the magnetic field produced by the emitter unit 104 and other nearby sources of magnetic fields. The receiver unit 106 is located below the emitter unit 104. In the illustrated embodiment, the plurality of sensors 112a-112t includes twenty receiver coils disposed in a two-dimensional array lying extending parallel to the inspected surface 146 of the test object 102. Fewer or more sensors can be used in other embodiments. The plurality of response signals 114a-114t includes twenty time-varying electrical signals conveying information about the eddy currents induced within the test object 102. For example, in some embodiments, variations in the magnitude and/or phase of the induced eddy currents can be determined from the response signals 114a-114t to yield information about flaws or other features present in the test object 102.

Referring to FIG. 10, the readout circuit 110 is electrically coupled to the receiver unit 106 to receive and process the plurality of response signals 114a-114t generated by the plurality of sensors 112a-112t. In the illustrated embodiment, the readout circuit 110 generally includes twenty input circuit ports 118a-118t, twenty anti-aliasing filters 122a-122t, and four multiplexers 124a-124d. In contrast to the embodiment of FIGS. 1 to 3, the readout circuit 110 of the embodiment of FIGS. 8 to 10 does not include amplifiers between the sensors 112a-112t and the anti-aliasing filters 122a-122t. One reason is that the magnitudes of the response signals 114a-114t in ECT are often larger than in RFT, in which case providing amplifiers before the anti-aliasing filters 122a-122t may be omitted. In such embodiments, the ratio between the output impedance of the sensors 112a-112t and the input impedance of the anti-aliasing filters 122a-122t may be set or adjusted to a suitable value, for example, ranging from nearly zero to about 0.2.

In operation, each one of the plurality of input circuit ports 118a-118t is configured to receive the response signal 114a-114t from a respective one of the sensors 112a-112t. Each one of the plurality of anti-aliasing filters 122a-122t is configured to bandlimit a respective one of the plurality of response signals 114a-114t to produce a respective one of a plurality of bandlimited signals 128a-128t. Each one of the four multiplexers 124a-124d is coupled to a respective one of the four subsets of anti-aliasing filters 122a-122c, 122f-122j, 122k-122o, 122p-122t. Each one of the four multiplexers 124a-124d is configured to multiplex, at a TDM frame rate $f_{TDM}$, a respective one of the four subsets of bandlimited signals 128a-128e, 128f-128j, 128k-128o, 128p-128t into a respective one of four TDM signals 130a-130d. As in the embodiments of FIGS. 1 to 3, the anti-aliasing filters 122a-122t in FIGS. 8 to 10 are configured to operate based on the TDM frame rate from of the multiplexers 124a-124d to attenuate aliasing artifacts in the TDM signals 130a-130d. For example, in one embodiment, the anti-aliasing filters 122a-122t may each be embodied by a first-order Butterworth low-pass filter having an attenuation function A(f) given by Equation (2). In this example, if $f_{ex}$=1 kHz, $f_{TDM}$=20 kHz, and $f_{att}$=$f_{TDM}$-$f_{ex}$=19 kHz, then a cutoff frequency $f_c$ of 4 kHz would yield an attenuation factor A($f_{att}$)=79.40% at $f_{att}$ and an attenuation factor A($f_{ex}$)=2.99% at $f_{ex}$, which can prove acceptable in certain applications.

Referring still to FIGS. 8 to 10, the readout circuit 110 may include or be connected to analog-to-digital converters 132a-132d configured to digitize the TDM signals 130a-130d into digital TDM signals 134a-134d. The readout circuit 110 may also include or be connected to a processor 136 configured to process the digital TDM signals 134a-134d to determine therefrom information conveying a characteristic of the test object 102. The processing of the digital TDM signals 134a-134d can include a demultiplexing operation by one or more demultiplexers provided in the processor 136. The characteristic of the object can relate to a flaw (e.g., a crack or another defect), a dimensional parameter (e.g., a thickness measurement), and/or a material property (e.g., a conductivity or permeability measurement). The processor 136 may also be configured for controlling, monitoring, or coordinating the functions and operations of various components of the inspection system 100. For example, the processor 136 may be configured to send control signals 138a-138d to the multiplexers 124a-124d to control their operation. The inspection system 100 may also include a memory 140 capable of storing computer programs and other data to be retrieved by the processor 136.

Figure 11:
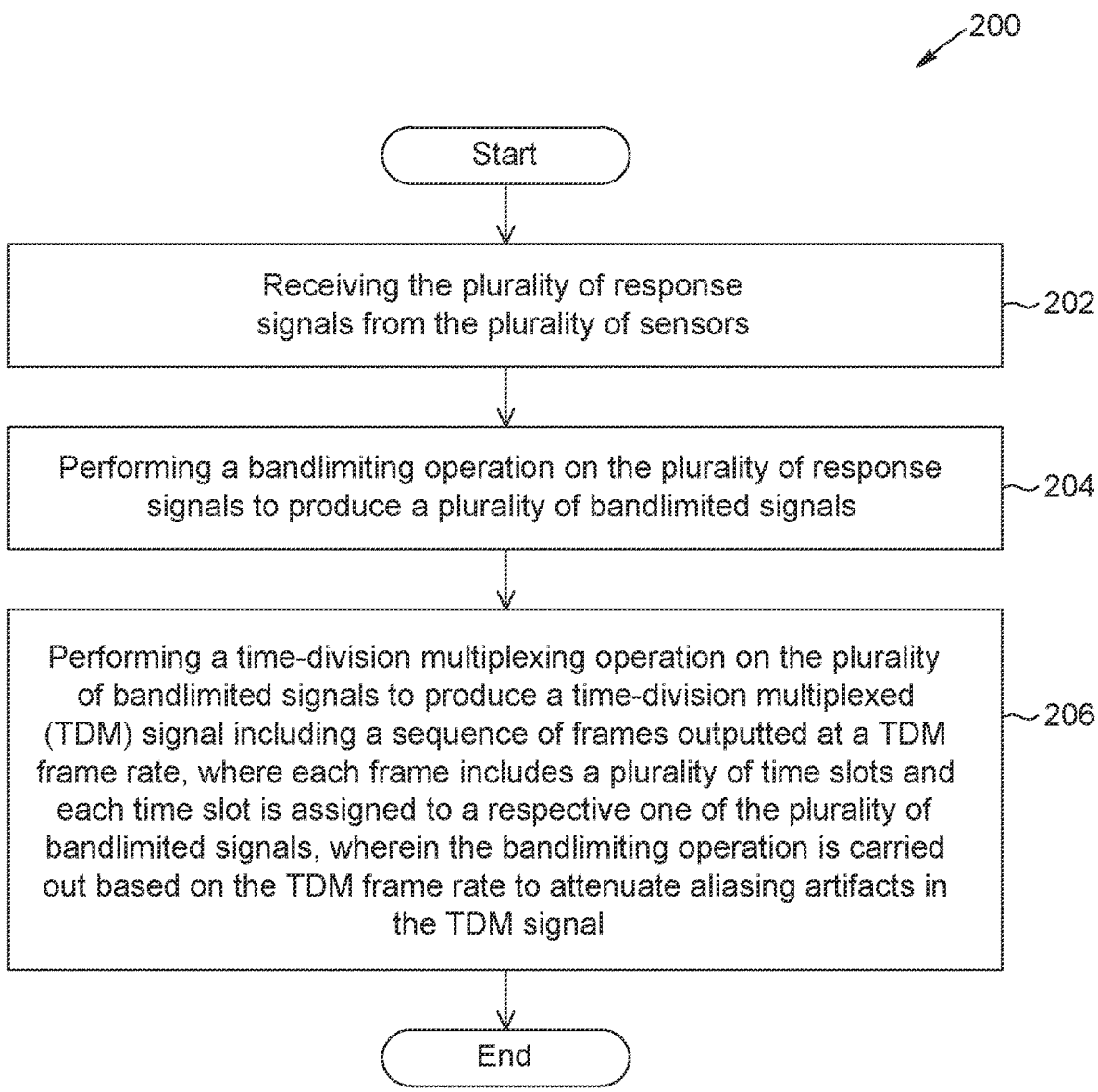
FIG. 11 is a flow diagram of a readout method for use in an electromagnetic inspection system for nondestructive testing of a test object.

Referring to FIG. 11, in accordance with another aspect, there is provided a flow diagram of an embodiment of a readout method 200 for use in an electromagnetic inspection system for nondestructive testing of a test object. The electromagnetic inspection system includes a plurality of sensors configured to generate a respective plurality of response signals indicative of an electromagnetic response induced from the test object. The readout method 200 may be implemented with an electromagnetic inspection system such as the ones described above with references to FIG. 1 to 10, or another electromagnetic inspection system. The method 200 can include a step 202 of receiving the plurality of response signals from the plurality of sensors, a step 204 of performing a bandlimiting operation on the plurality of response signals to produce a plurality of bandlimited signals, and a step 206 of performing a time-division multiplexing operation on the plurality of bandlimited signals to produce a time-division multiplexed (TDM) signal including a sequence of frames outputted at a TDM frame rate, where each frame includes a plurality of time slots, and each time slot is assigned to a respective one of the plurality of bandlimited signals. As noted above, the bandlimiting operation is carried out based on the TDM frame rate to attenuate aliasing artifacts in the TDM signal.

In some embodiments, the readout method 200 further includes preliminary steps of using the plurality of sensors: to sense the electromagnetic response induced from the test object and generate the plurality of response signals from the sensed electromagnetic response.

In some embodiments, each response signal has a main signal component at an excitation frequency, and the bandlimiting operation 204 includes attenuating each response signal at frequencies above an attenuating frequency equal to the TDM frame rate minus the excitation frequency. In some embodiments, the attenuating frequency equal to or less than half the TDM frame rate. In some embodiments, the bandlimiting operation 204 includes attenuating a magnitude of each response signal by at least 75% at the attenuating frequency and by at most 5% at the excitation frequency. In some embodiments, the bandlimiting operation 204 includes low-pass filtering the plurality of response signals to produce the plurality of bandlimited signals. In other embodiments, the bandlimiting operation 204 includes band-pass filtering the plurality of response signals to produce the plurality of bandlimited signals.

In some embodiments, the TDM operation 206 includes setting the TDM frame rate to range between about 10 kHz and about 500 kHz.

In some embodiments, the readout method 200 further includes a step of amplifying each response signal prior to performing the bandlimiting operation.

In some embodiments, the readout method 200 further includes steps of digitizing the TDM signal into a digital TDM signal, and processing the digital TDM signal to determine therefrom information conveying a characteristic associated with test object. In some embodiments, the digital TDM signal includes demultiplexing the digital TDM signal.

Numerous modifications could be made to the embodiments described above without departing from the scope of the appended claims.

The invention claimed is:

1. A readout circuit for an electromagnetic inspection system for nondestructive testing of a test object, the electromagnetic inspection system comprising a plurality of sensors configured to sense an electromagnetic response from the test object and generate a respective plurality of response signals from the sensed electromagnetic response, the readout circuit comprising:
   a plurality of anti-aliasing filters, each anti-aliasing filter being configured to receive the response signal from a respective one of the sensors and to bandlimit the respective response signal to produce a respective one of a plurality of bandlimited signals; and
   a time-division multiplexer coupled to the plurality of anti-aliasing filters and configured to multiplex the plurality of bandlimited signals into a time-division multiplexed (TDM) signal, the TDM signal comprising a sequence of frames outputted at a TDM frame rate, each frame comprising a plurality of time slots, each time slot being assigned to a respective one of the plurality of bandlimited signals,
   wherein the plurality of anti-aliasing filters is configured to operate based on the TDM frame rate to attenuate aliasing artifacts in the TDM signal.

2. The readout circuit of claim 1, wherein each response signal has a main signal component at an excitation frequency, and wherein each anti-aliasing filter is configured to attenuate the respective response signal at frequencies above an attenuating frequency equal to the TDM frame rate minus the excitation frequency.

3. The readout circuit of claim 2, wherein the excitation frequency ranges from about 2 Hz to about 20 kHz, and wherein the TDM frame rate ranges between about 10 kHz and about 500 kHz.

4. The readout circuit of claim 2, wherein each anti-aliasing filter is configured to attenuate a magnitude of the respective response signal by at least 75% at the attenuating frequency and by at most 5% at the excitation frequency.

5. The readout circuit of claim 1, wherein each response signal has a main signal component at an excitation frequency, wherein each anti-aliasing filter is configured to attenuate the respective response signal at frequencies above an attenuating frequency, and wherein the attenuating frequency is equal to or less than half the TDM frame rate and is higher than the excitation frequency.

6. The readout circuit of claim 1, wherein at least one of the plurality of anti-aliasing filters is a low-pass filter.

7. The readout circuit of claim 1, wherein at least one of the plurality of anti-aliasing filters is a band-pass filter.

8. The readout circuit of claim 1, wherein the number of anti-aliasing filters ranges between 8 and 128.

9. The readout circuit of claim 1, wherein the readout circuit further comprises a plurality of amplifiers, wherein each amplifier is coupled between a respective one of the plurality of sensors and a respective one of the plurality of anti-aliasing filters, and wherein each amplifier is configured to amplify the respective response signal prior to the respective response signal reaching the respective anti-aliasing filter.

10. A readout method for an electromagnetic inspection system for nondestructive testing of a test object, the electromagnetic inspection system comprising a plurality of sensors configured to generate a respective plurality of response signals indicative of an electromagnetic response induced from the test object, the readout method comprising:

receiving the plurality of response signals from the plurality of sensors;

performing a bandlimiting operation on the plurality of response signals to produce a plurality of bandlimited signals; and performing a time-division multiplexing operation on the plurality of bandlimited signals to produce a time-division multiplexed (TDM) signal comprising a sequence of frames outputted at a TDM frame rate, each frame comprising a plurality of time slots, each time slot being assigned to a respective one of the plurality of bandlimited signals, wherein the bandlimiting operation is carried out based on the TDM frame rate to attenuate aliasing artifacts in the TDM signal.

11. The readout method of claim 10, further comprising, with the plurality of sensors:

sensing the electromagnetic response induced from the test object; and generating the plurality of response signals from the sensed electromagnetic response.

12. The readout method of claim 10, wherein each response signal has a main signal component at an excitation frequency, and wherein the bandlimiting operation comprises attenuating each response signal at frequencies above an attenuating frequency equal to the TDM frame rate minus the excitation frequency.

13. The readout method of claim 10, further comprising amplifying each response signal prior to performing the bandlimiting operation.

14. The readout method of claim 10, further comprising:
digitizing the TDM signal into a digital TDM signal; and
processing the digital TDM signal to determine therefrom information conveying a characteristic associated with test object.

15. An electromagnetic inspection system for nondestructive testing of a test object, the electromagnetic inspection system comprising:

an emitter unit configured to generate an excitation signal to induce an electromagnetic response from the test object;

a receiver unit comprising a plurality of sensors configured to sense the electromagnetic response induced from the test object and generate a respective plurality of response signals from the sensed electromagnetic response; and a readout circuit comprising:
a plurality of anti-aliasing filters, each anti-aliasing filter being configured to receive the response signal from a respective one of the sensors and to bandlimit the respective response signal to produce a respective one of a plurality of bandlimited signals; and
a time-division multiplexer coupled to the plurality of anti-aliasing filters and configured to multiplex the plurality of bandlimited signals into a time-division multiplexed (TDM) signal, the TDM signal comprising a sequence of frames outputted at a TDM frame rate, each frame comprising a plurality of time slots, each time slot being assigned to a respective one of the plurality of bandlimited signals,
wherein the plurality of anti-aliasing filters is configured to operate based on the TDM frame rate to attenuate aliasing artifacts in the TDM signal.

16. The electromagnetic inspection system of claim 15, wherein the excitation signal generated by the emitter unit is a time-varying magnetic field, the electromagnetic response induced from the test object comprises magnetic fields produced by eddy currents induced within the test object by the time-varying magnetic field generated by the emitter unit, and the plurality of response signals generated by the plurality of sensors conveys information about the eddy currents induced within the test object.

17. The electromagnetic inspection system of claim 15, wherein the emitter unit comprises a least one emitter coil, and wherein the plurality of sensors comprises a plurality of receiver coils.

18. The electromagnetic inspection system of claim 15, wherein the electromagnetic inspection system is implemented as an eddy-current array probe, a remote-field array probe, a near-field array probe, or a combination thereof.

19. The electromagnetic inspection system of claim 15, further comprising:

an analog-to-digital converter implemented in or connected to the readout circuit, the analog-to-digital converter being configured to digitize the TDM signal into a digital TDM signal; and a processor configured to process the digital TDM signal to determine therefrom information conveying a characteristic of the test object.

20. The electromagnetic inspection system of claim 19, wherein the characteristic of the test object relates to a flaw, a dimensional parameter, a material property, or any combination thereof.

* * * * *